W. J. McCOLLISTER.
AUTOMOBILE LOCK.
APPLICATION FILED MAY 4, 1916.
1,197,513.
Patented Sept. 5, 1916.
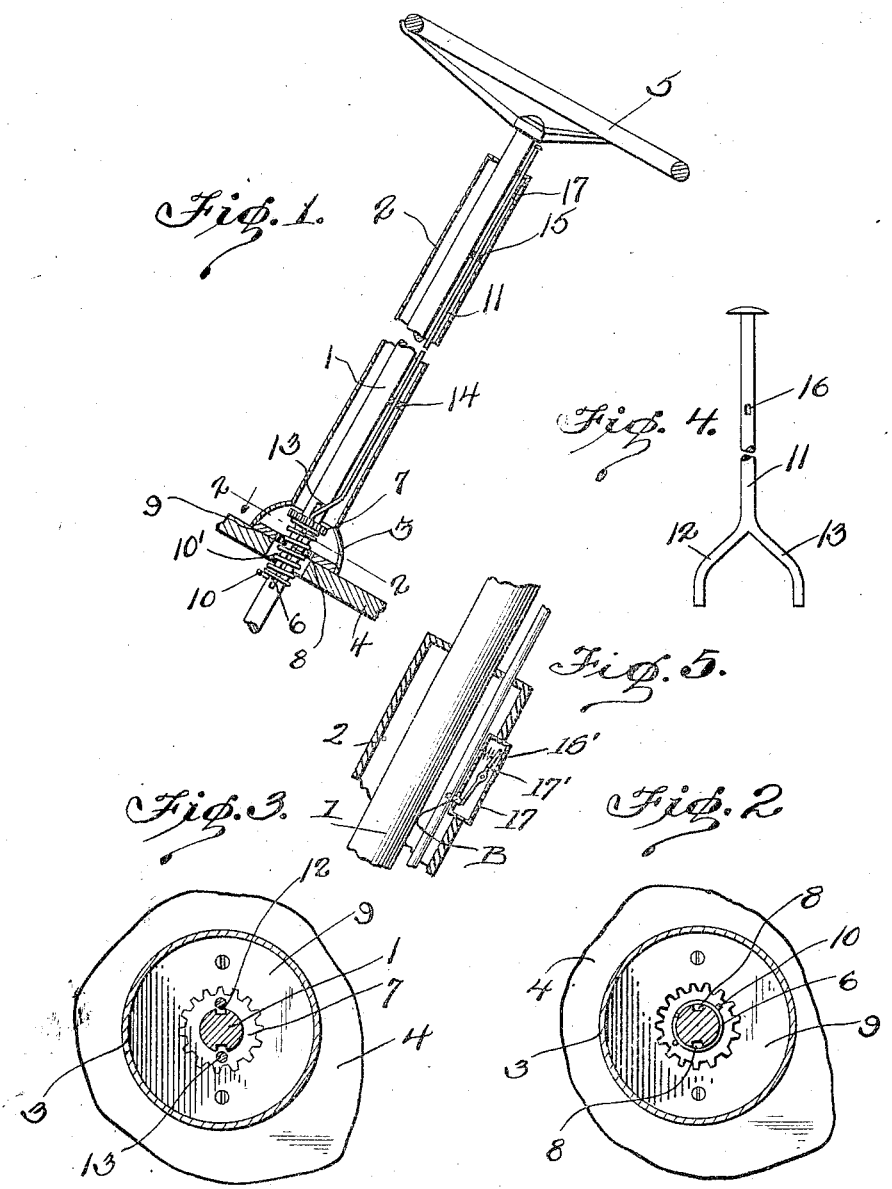
WITNESSES
INVENTOR
Walter J. McCollister
BY
ATTORNEY

UNITED STATES PATENT OFFICE.

WALTER J. McCOLLISTER, OF PONDCREEK, OKLAHOMA.

AUTOMOBILE-LOCK.

1,197,513.   Specification of Letters Patent.   Patented Sept. 5, 1916.

Application filed May 4, 1916. Serial No. 95,447.

*To all whom it may concern:*

Be it known that I, WALTER J. McCOLLISTER, a citizen of the United States, residing at Pondcreek, in the county of Grant and State of Oklahoma, have invented certain new and useful Improvements in Automobile-Locks, of which the following is a specification.

This invention relates to improvements in automobile locks and more particularly to a lock for rigidly securing the steering wheel of an automobile against movement whereby the wheels of the automobile together with the steering post will be locked in any desired position whereby the operation of the automobile will be prevented by any person not possessing a key for the lock.

As a further object of the invention the device contemplates the provision of a locking device which will be concealed within the casing of the steering post and which may be operated from a point adjacent the steering wheel.

The above and additional objects are accomplished by such means as are illustrated in the preferred embodiment and in the accompanying drawings, wherein like characters denote like or corresponding parts throughout the several views, in which:—

Figure 1 is a vertical section through the steering wheel of an automobile showing the device applied thereto. Fig. 2 is a transverse section on a line 2—2 of Fig. 1 showing the device in unlocked position. Fig. 3 is a similar view showing the device in locked position. Fig. 4 is a detailed elevation of the locking rod. Fig. 5 is an enlarged longitudinal section on a larger scale than Fig. 1 showing the lock in detail.

The steering post 1 is mounted within a casing 2 the lower end of which is enlarged as at 3 and is fastened to the foot board 4 in the usual manner. The upper end of the steering rod 1 carries the usual steering wheel 5. A slot or keyway 6 is formed on opposite sides of the steering rod 1 and mounted upon the steering rod for sliding movement is a gear wheel 7 having the steering rod 1 extending through its central aperture; and the edge of the central aperture has integrally formed therewith the lugs 8 which project into the slots 6 of the steering rod 1, thereby allowing the gear wheel 7 to slide freely on the steering rod and to rotate with the wheel when the device is in unlocked position.

Resting upon the foot board 4 and arranged within the large portion 3 of the casing or steering column 2 is a plate 9 having a central opening formed therein the edge of which is provided with a plurality of teeth which are of the same pitch as the teeth of the gear wheel 7 and these teeth are adapted to mesh with the teeth of the gear wheel for locking the device.

A pin 10 projects from the steering rod 1 at a point below the under face of the foot board 4.

Encircling the steering rod and interposed between the bottom face of the gear wheel 7 and the pin 10 is a coil spring 10′ which tends to normally hold the gear wheel 7 up and out of engagement with the teeth of the plate 9. The gear wheel 7 is moved into operative or locked position by a locking rod 11 which is arranged within the casing 2 and extends outwardly at the upper end thereof where it may be operated by the hand of the driver of the automobile. The lower end of the locking rod is bifurcated to provide the arms 12 and 13 which engage the top of the gear wheel 7. The inner wall of the steering column or casing 2 is provided with bearings 14 and 15 through which the locking rod extends and the locking rod is provided with a slot 16 which is adapted to receive the bolt of the key operated lock 17 mounted in the steering column at the upper end thereof. The steering column is provided with an opening in which is set the lock 17 having its locking bolt extending inwardly toward the center of the steering column and having its exterior face exposed so that a key may be inserted for operating the lock. As shown in detail, in Fig. 5 of the drawing, the lock consists of a casing in which is mounted a pivoted lever 17′. One end of the lever carries the bolt B which is adapted to register with the slot 16 when the key is withdrawn from the keyhole 16′ in the casing. A coil spring, within the casing, tends to normally hold the bolt B in engagement with a slot 16 and when the key is inserted through the key-hole it is then turned and remains in position while the lock is in unlocked position. The lock 17 may be of any suitable construction and the key of the lock is retained by the driver of the machine after the device has been locked in secured position whereby tampering with the locking device will be prevented.

In the operation of the device, we will assume that the parts are in position as shown by Fig. 1 of the drawing. The steering wheel may be turned until the wheels of the automobile are turned to either the right or to the left and the locking rod 11 is then thrust downwardly causing the teeth of the gear wheel 7 to engage the teeth of the plate 9 whereupon the lock 17 will be operated for holding the locking rod in position to retain the gear wheel against the action of the coil spring 10'.

I claim:

1. In an automobile lock, the combination with a steering column mounted upon the foot-board of an automobile, the foot-board provided with an aperture in alinement with the said column, a plate mounted upon the foot-board and provided with a central circular aperture, the edge of the aperture being provided with a plurality of gear teeth, a steering post mounted within the steering column and extending through the aperture in said foot-board the said steering rod being provided with oppositely disposed longitudinally extending slots, lugs carried by said gear wheel and projecting into the said slots whereby the said gear wheel may be moved into and out of engagement with the teeth on said plate, and means arranged within said steering column and contacting with said gear wheel for moving said gear wheel into and out of engagement with said plate.

2. In an automobile lock, the combination with a steering column mounted upon the foot-board of an automobile, an enlarged lower end formed on said steering column, a plate mounted upon the foot-board and provided with interior gear teeth, a locking element adapted to be moved into and out of engagement with said interior teeth, said column being provided with a steering post extending through the said foot-board and carrying said locking element, means resiliently engaging said locking element for normally holding the said locking element out of engagement with said interior gear teeth, and a locking rod disposed within said steering column and having its lower end bifurcated and engaging said locking element at each side of said steering column and adapted to engage said locking rod when said rod is operated to move said locking element into engagement with said gear teeth, the said locking rod being provided with a recess with which said lock co-acts for holding the rod downwardly against the tension of said resilient means.

3. The combination with a steering column and steering post of an automobile, the said steering column being enlarged at its lower end and disposed upon the foot-board of the automobile, a plate arranged within the enlarged end and mounted upon the foot-board, said plate being provided with a central aperture having gear teeth arranged around its edge, a gear wheel slidably mounted on the steering post and within the enlarged end of the steering column, and an operating rod arranged within the steering column and extending outwardly at one end thereof, the lower end of said operating rod engaging said gear wheel for moving said gear wheel into and out of engagement with the gear teeth on said plate.

4. The combination with a steering column and steering post of an automobile, the said steering column being enlarged at its lower end and disposed upon the foot-board of the automobile, a plate arranged within the enlarged end and mounted upon the foot-board, said plate being provided with a central aperture having gear teeth arranged around its edge, a gear wheel slidably mounted on the steering post and within the enlarged end of the steering column, an operating rod arranged within the steering column and extending outwardly at one end thereof, the lower end of said operating rod engaging said gear wheel for moving said gear wheel into and out of engagement with the gear teeth on said plate, the said steering column being provided with an opening at its upper end, a key operated lock set in the opening in the steering column and having a bolt extending into said steering column, the said operating rod provided with a depression for receiving the bolt of said lock for holding said gear wheel in engagement with the gear teeth of said plate.

In testimony whereof I affix my signature in presence of two witnesses.

WALTER J. McCOLLISTER.

Witnesses:
W. G. BLACK,
O. E. STRECKER.